(12) United States Patent
Yoshida et al.

(10) Patent No.: US 6,394,072 B1
(45) Date of Patent: May 28, 2002

(54) FUEL INJECTION DEVICE FOR ENGINE

(75) Inventors: Takeo Yoshida; Yoshikazu Nakamura; Minoru Suzuki; Ryoichi Hirai, all of Iwata (JP)

(73) Assignee: Yamaha Hatsudoki Kabushiki Kaisha, Iwata (JP)

( * ) Notice: Subject to any disclaimer, the term of this patent is extended or adjusted under 35 U.S.C. 154(b) by 0 days.

(21) Appl. No.: 08/332,656

(22) Filed: Nov. 1, 1994

Related U.S. Application Data

(63) Continuation of application No. 07/753,708, filed on Sep. 3, 1991.

(30) Foreign Application Priority Data

Aug. 31, 1990 (JP) ............................................. 2-230115

(51) Int. Cl.⁷ ............................................. F02M 37/04
(52) U.S. Cl. ...................................... 123/506; 123/496
(58) Field of Search ................................. 123/497, 494, 123/496, 506, 500, 501, 446, 447, 456

(56) References Cited

U.S. PATENT DOCUMENTS

| | | | | |
|---|---|---|---|---|
| 3,709,639 A | * | 1/1973 | Suda et al. ................... | 417/493 |
| 3,762,379 A | * | 10/1973 | Hobo .......................... | 123/497 |
| 3,999,529 A | * | 12/1976 | Davis .......................... | 123/506 |
| 4,248,194 A | * | 2/1981 | Prutchas ...................... | 123/497 |
| 4,535,742 A | * | 8/1985 | Laufer ......................... | 123/506 |
| 4,535,942 A | * | 8/1985 | Laufer ......................... | 123/506 |
| 4,699,103 A | * | 10/1987 | Tsukahara .................... | 123/497 |
| 4,730,585 A | * | 3/1988 | Abe ............................. | 123/496 |
| 4,793,313 A | * | 12/1988 | Paganon ...................... | 123/506 |
| 4,831,988 A | * | 5/1989 | Hoefken et al. ............. | 123/501 |
| 4,920,942 A | * | 5/1990 | Fujimori ..................... | 123/497 |
| 5,007,400 A | * | 4/1991 | Baditzka ..................... | 123/506 |
| 5,058,553 A | * | 10/1991 | Kondo et al. ............... | 123/456 |
| 5,085,193 A | * | 2/1992 | Morikawa ................... | 123/497 |
| 5,406,922 A | * | 4/1995 | Tuckey ....................... | 123/497 |
| 5,630,399 A | * | 5/1997 | Nomura ...................... | 123/467 |

FOREIGN PATENT DOCUMENTS

| | | |
|---|---|---|
| DE | C-3147467 | 4/1983 |
| EP | A-2043871 | 11/1987 |
| FR | A-2610674 | 11/1987 |
| GB | A-2091805 | 8/1982 |
| GB | A-2165895 | 4/1986 |

* cited by examiner

*Primary Examiner*—Carl S. Miller
(74) *Attorney, Agent, or Firm*—Ernest A. Beutler

(57) ABSTRACT

A high pressure fuel injection system for an internal combustion engine having a high pressure pump for delivering fuel to a fuel injector. The pressure output of the pump is sensed and is controlled to provide appropriate fuel pressure to the fuel injector for the given running condition. In addition, a release passage is formed that intersects the high pressure pump at a point intermediate the ends of its stroke and which is controlled by a control valve for releasing pressure to further provide pressure control. Even if fully opened due to failure, the release valve will not preclude the generation of pressure sufficient to run the engine.

28 Claims, 14 Drawing Sheets

FUEL INJECTION DEVICE FOR ENGINE

This application is a continuation of application Ser. No. 07/753,708, filed Sep. 3, 1991.

BACKGROUND OF THE INVENTION

This invention relates to a fuel injection device for an engine and more particularly to an improved arrangement for controlling the amount of fuel supplied by the fuel injector of an internal combustion engine.

The advantages of fuel injection for internal combustion engines are well known. One particularly popular type of fuel injector is the so called "accumulator type" in which fuel is supplied to the injector under pressure and then is injected when the injection valve is opened. This type of injector is extremely efficient and advantageous. However, the amount of fuel required per injection cycle varies widely with engine running conditions such as speed and load. Even the accumulator type of fuel injector can have some difficulties in providing the appropriate fuel control under all running conditions.

There is disclosed in U.S. Letters Pat. No. 4,969,442, entitled High Pressure Fuel Injection Device For Engine, issued Nov. 13, 1990 and assigned to the assignee hereof, an arrangement for controlling the amount of fuel supplied by an accumulator type of injector through varying the pressure at which the fuel is delivered to the injector. Varying the pressure at which the fuel is supplied to the injector is more effective, under some conditions, than varying the duration of injection so as to control the amount of fuel supplied. In the construction shown in U.S. Pat. No. 4,969,442 the pressure of the fuel supplied to the injector is varied by varying the phase of the injector or high pressure pump. Although this method is highly effective, it does require a mechanical adjustment of the phase of the pump and can, in some regards, be more costly than desirable.

It is, therefore, a principal object of this invention to provide an improved arrangement for controlling pressure of the fuel supplied to a fuel injector.

It is a further object of this invention to provide a fuel supply system for a fuel injector wherein the pressure of the fuel supplied to the injector is controlled so as to control the amount of fuel injected per cycle.

It is another object of this invention to provide a fuel injection device for an engine wherein the amount of fuel injected can be controlled by controlling the pressure at which the fuel is supplied to the injector.

In accordance with one feature of the invention, the fuel pressure is controlled by providing a selectively operable relief valve which is controlled to vary the fuel pressure by relieving it with the amount of relief being dependent upon the engine running condition. Although such a device is extremely effective, there are certain running conditions during which it may be desirable to provide full pressure to the injector and yet limit the pressure supplied to the injector under other conditions. That is, it is desirable to provide a greater fuel pressure during starting and also at maximum load condition. This cannot always be accomplished as efficiently as possible solely through the use of pressure control of the outlet of the high pressure pump.

It is, therefore, a still further object of this invention to provide an improved arrangement for controlling the amount of output of a high pressure fuel injection pump.

It is a further object of this invention to provide an arrangement for controlling the output pressure of a high pressure pump in a simple and highly effective manner.

SUMMARY OF THE INVENTION

A first feature of this invention is adapted to be embodied in a fuel injection system for an internal combustion engine that is comprised of a high pressure pump and a fuel injector. Means are provided for communicating the output pressure of the high pressure pump to the fuel injector for injection into the engine. In accordance with this feature of the invention, a return line is provided in the conduit connecting the output of the high pressure pump with the fuel injector. A pressure controlling valve is provided in this return line for controlling the pressure at which the fuel is supplied to the injector from the high pressure pump. The pressure of the supply is controlled in response to engine running conditions.

Another feature of the invention is adapted to be embodied in a high pressure pump for a fuel injection system having a plunger slidable in a bore for pressurizing fluid in the bore. A return passage intersects the bore at a point intermediate the ends of the stroke of the plunger. Selectively operable valve means are provided for opening and closing the return line for controlling the pressure generated by the high pressure pump.

Values of duty 0% and 100% are defined with adding a certain value on and deducting a certain value from the standard voltage.

Now a value "A" is defined as duty 0%.

And a value "B" is defined as duty 100%.

Further, a voltage value senses at time "$t_1$" is defined "a".

Method for determining duty value:

$$\frac{a-A}{B-A} \times 100 = \text{Duty value}$$

A period of sensing pressure "t" is predetermined, for example, synchronous to the engine rotation or to a computer clock pulse in the CPU 48.

A pulse duration $$\text{"}d\text{"} = \text{"}t\text{"} \times \frac{\text{Duty value}}{100}$$

DETAILED DESCRIPTION OF THE PREFERRED EMBODIMENTS OF THE INVENTION

Figure 1:
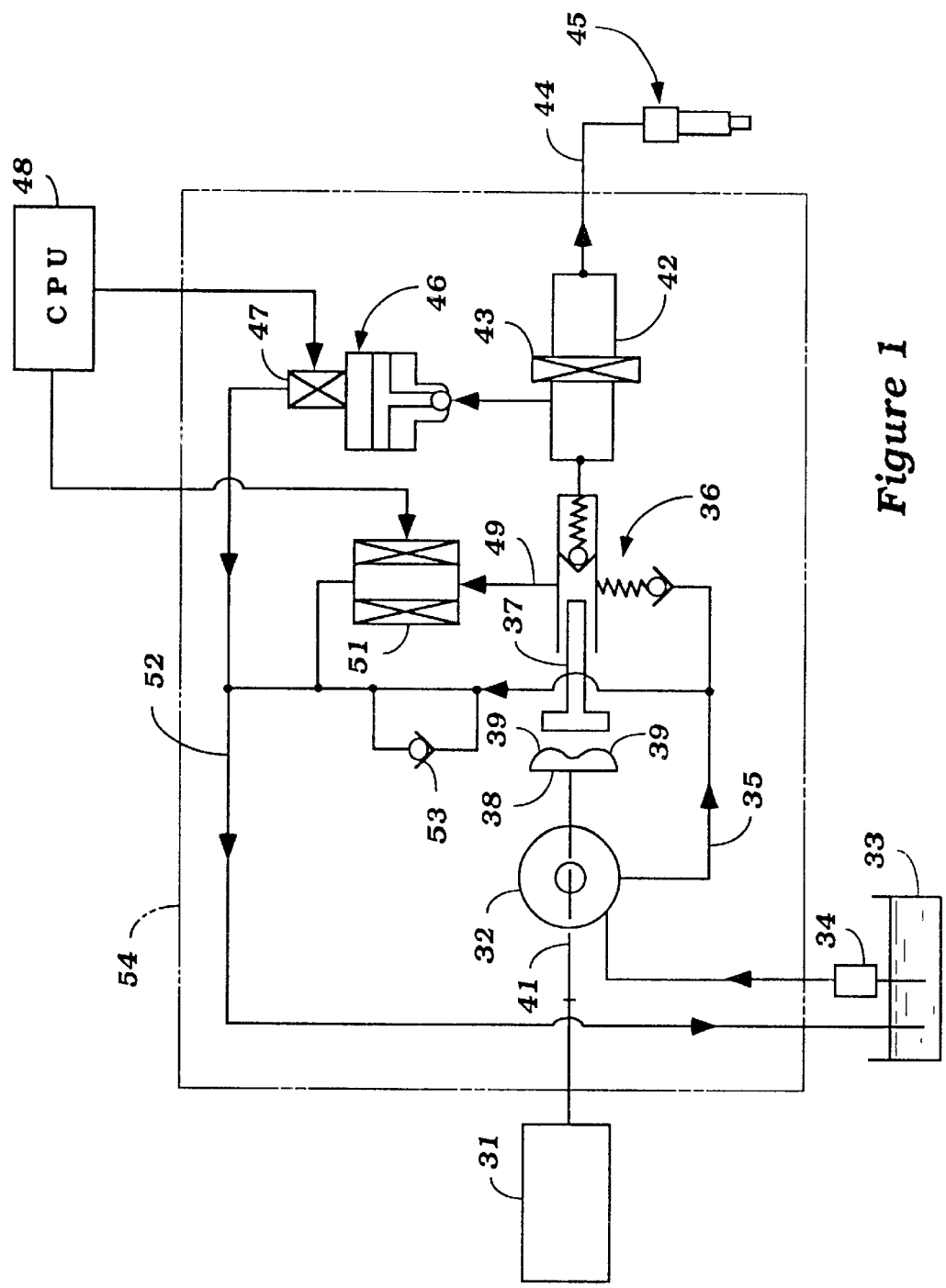
FIG. 1 is a partially schematic view of the fuel injection system of a internal combustion engine constructed in accordance with an embodiment of the invention.

Referring now in detail to the drawings and initially to FIG. 1, a fuel injection system for an internal combustion engine, indicated generally by the reference numeral 31 is shown partially schematically. The engine 31 is, in a preferred form of the invention, a multi-cylinder internal combustion engine operating on a diesel principal either of the four or two stroke type. Although the invention is described in connection with such an engine, it should be readily apparent to those skilled in the art that the invention may also be employed with other types of engines operating on other cycles including rotary engines and spark ignited engines.

The engine 31 drives a pump arrangement including a low pressure pump 32 that draws fuel from a fuel tank 33 through a conduit including a filter 34. The low pressure pump 32 outputs fuel under pressure through a low pressure line 35 to a high pressure piston type pump, indicated generally by the reference numeral 36. The piston pump 36 includes a plunger 37 that is operated by a cam 38 which rotates with the shaft of the low pressure pump 32 and which has a number of lobes 39 equal to the number of cylinders of the engine 31 so that the high pressure pump 36 will output a pressure pulse for each cylinder during a single rotation of the pump shaft, indicated schematically at 41.

The high pressure pump 36 outputs its pressure to a chamber 42 in which a filter element 43 is provided. The pressure chamber 42 communicates through a plurality of conduits 44 with individual accumulator type injectors 45, one for each cylinder of the engine.

In accordance with a feature of the invention, the pressure of the fuel delivered to the accumulator type injector 45 is controlled by a pressure regulating relief valve, shown schematically at 46 so as to vary the amount of fuel supplied to the engine by the injector 45 during each cycle of its operation. The pressure is controlled by means that includes solenoid 47 which is controlled by a CPU 48.

The amount of fuel supplied may also be controlled by means of a release passageway 49 in which a solenoid control release valve 51 is provided. Both the release passageway 49 and the pressure control release valve 46 control pressure by bypassing fuel back to the tank 33 through a return line 52.

There is also provided a pressure relief valve 53 in the conduit 35 that connects the low pressure pump 32 with the high pressure pump 36 for providing pressure relief in this circuit.

Figure 2:
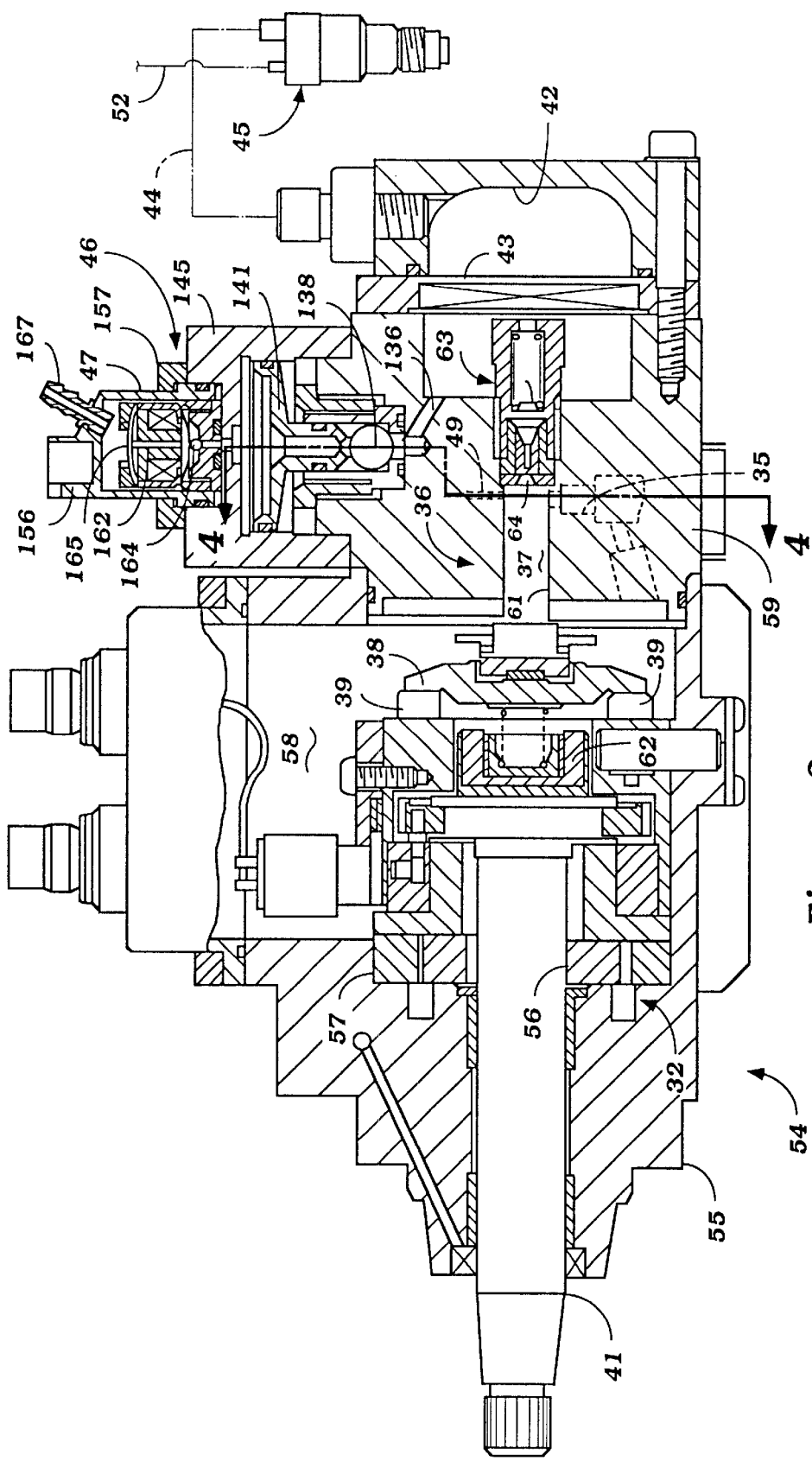
FIG. 2 is an enlarged view showing the injection pump system, partially in cross section, and its relationship to the injector.
Figure 3:
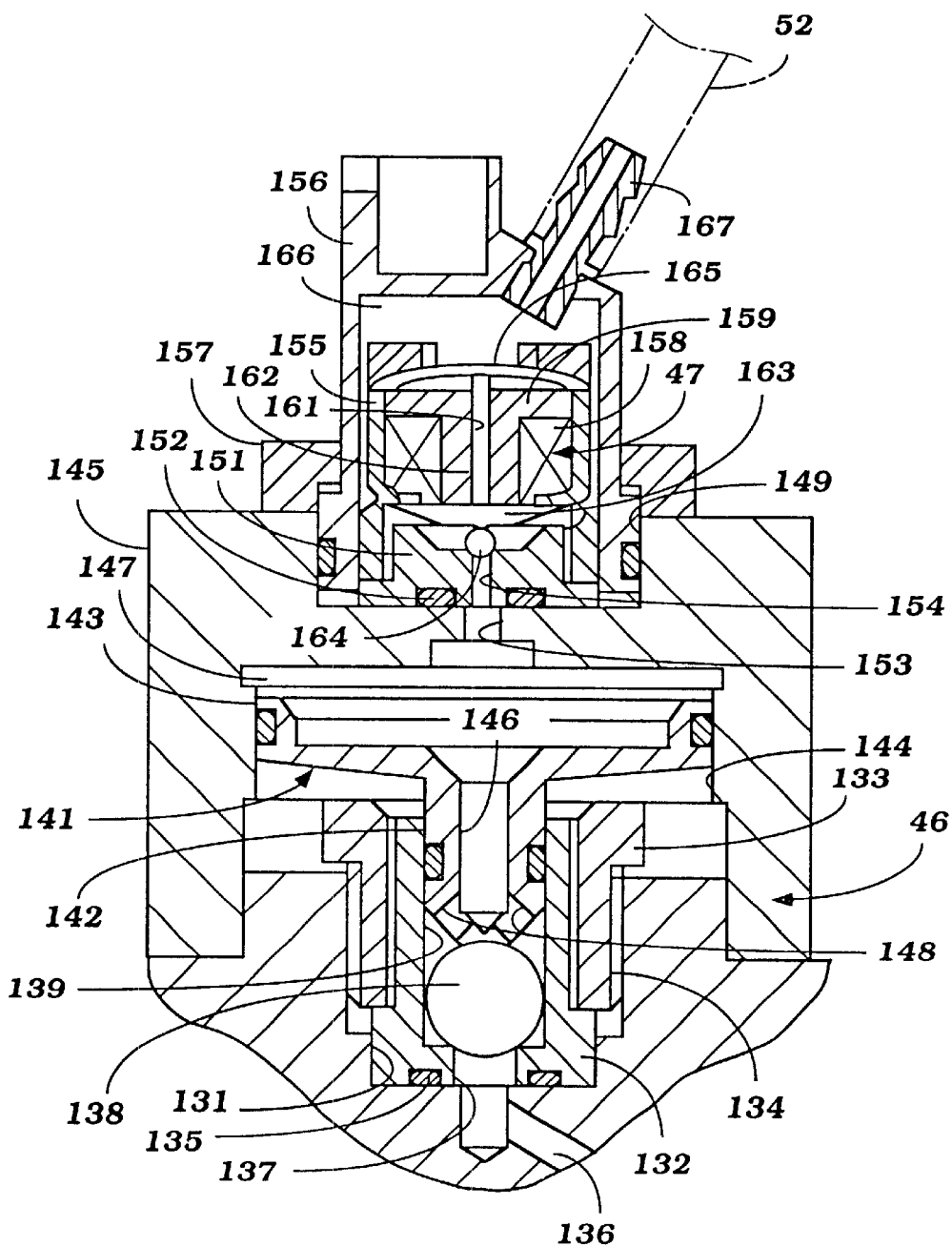
FIG. 3 is a further enlarged cross sectional view of the pressure controlling valve of the high pressure pump.
Figure 4:
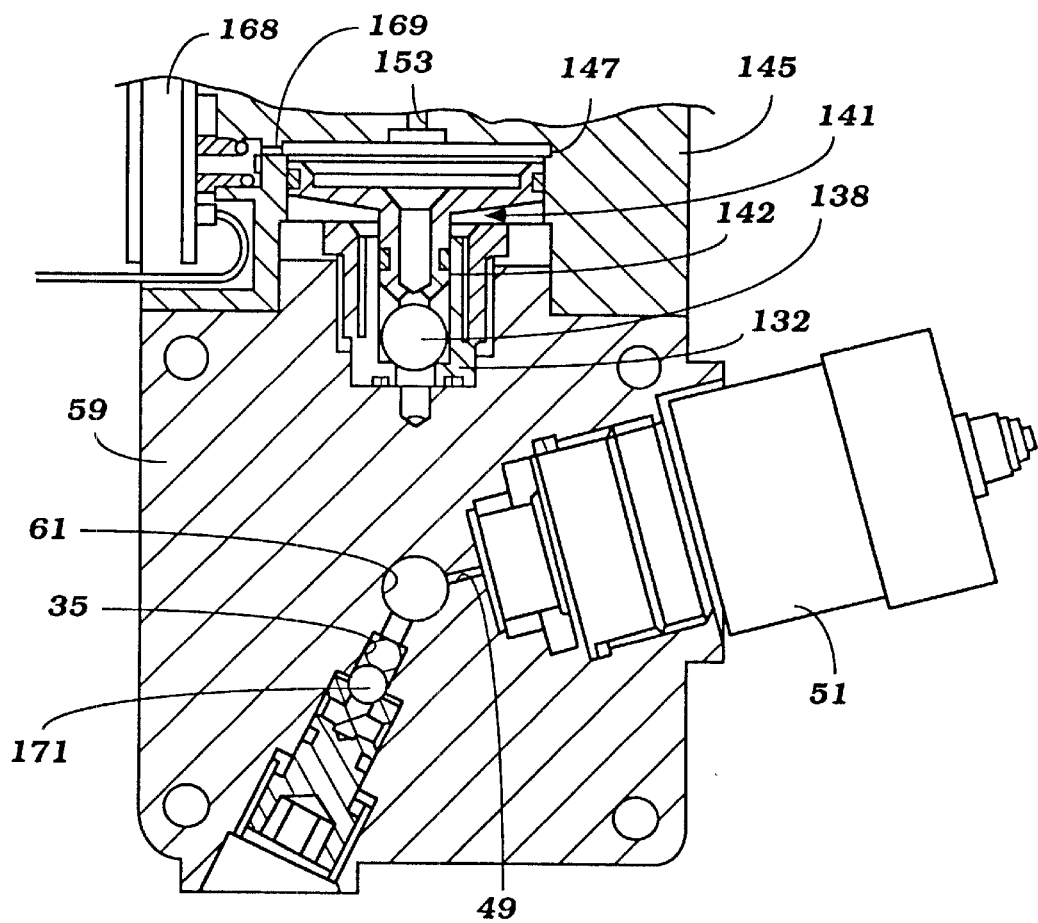
FIG. 4 is a cross sectional view taken along the line 4—4 of FIG. 2.

In accordance with a feature of the invention, the low pressure pump 32, high pressure pump 36, pressure chamber 42, pressure control valve 46 and bypass control valve 51 are all formed within a single housing, shown schematically by the reference numeral 54 in FIG. 1 and which is shown more detail FIGS. 2 through 4. Providing all of these components in a single housing assembly, it is possible to reduce the number of external circuits and conduits and, therefore, simplify the plumbing associated with the fuel injection system. This also reduces the liklihood of leaks and pressure losses in the system.

Referring now in detail to FIGS. 2 through 4, the housing assembly 54 includes an outer housing 55 in which the low pressure pump 32 is supported. The low pressure pump 32 is a gerotor type pump and includes an inner rotor 56 that is driven by the pump shaft 41 and which cooperates with an outer rotor 57 to supply pressurized fuel to a low pressure chamber 58 formed within the housing 55.

A plunger housing 59 closes the outer end of the chamber 58 and is affixed to the housing 55 in a suitable manner. The plunger housing 59 forms a portion of the high pressure pump 36 and defines a bore 61 in which the plunger 37 reciprocates. The passageway 35, previously referred, communicates the low pressure chamber 58 with the bore 61 for delivering fluid to the bore 61 above the plunger 37 when the plunger is at the down end of its stroke.

As may be best seen in this figure, the cam plate 38 is connected to the pump drive shaft 41 by means of a coupling 62 and the lobes 39 which effect the reciprocation of the cam plate 38 are clearly shown in this figure.

As the plunger 37 begins its pumping stroke, fuel is delivered under pressure to the upstream side of the filter 43 in the pressure chamber 42 through a delivery check valve, indicated generally by the reference numeral 63. The delivery check valve 63 communicates a delivery port 64 at the end of the pump cylinder 61 through a one way check valve 65. Fuel is then delivered, as aforenoted, through the delivery conduit 44 to the accumulator type injector nozzle 45, the construction of which is best shown in FIGS. 5 through 12.

Figure 5:
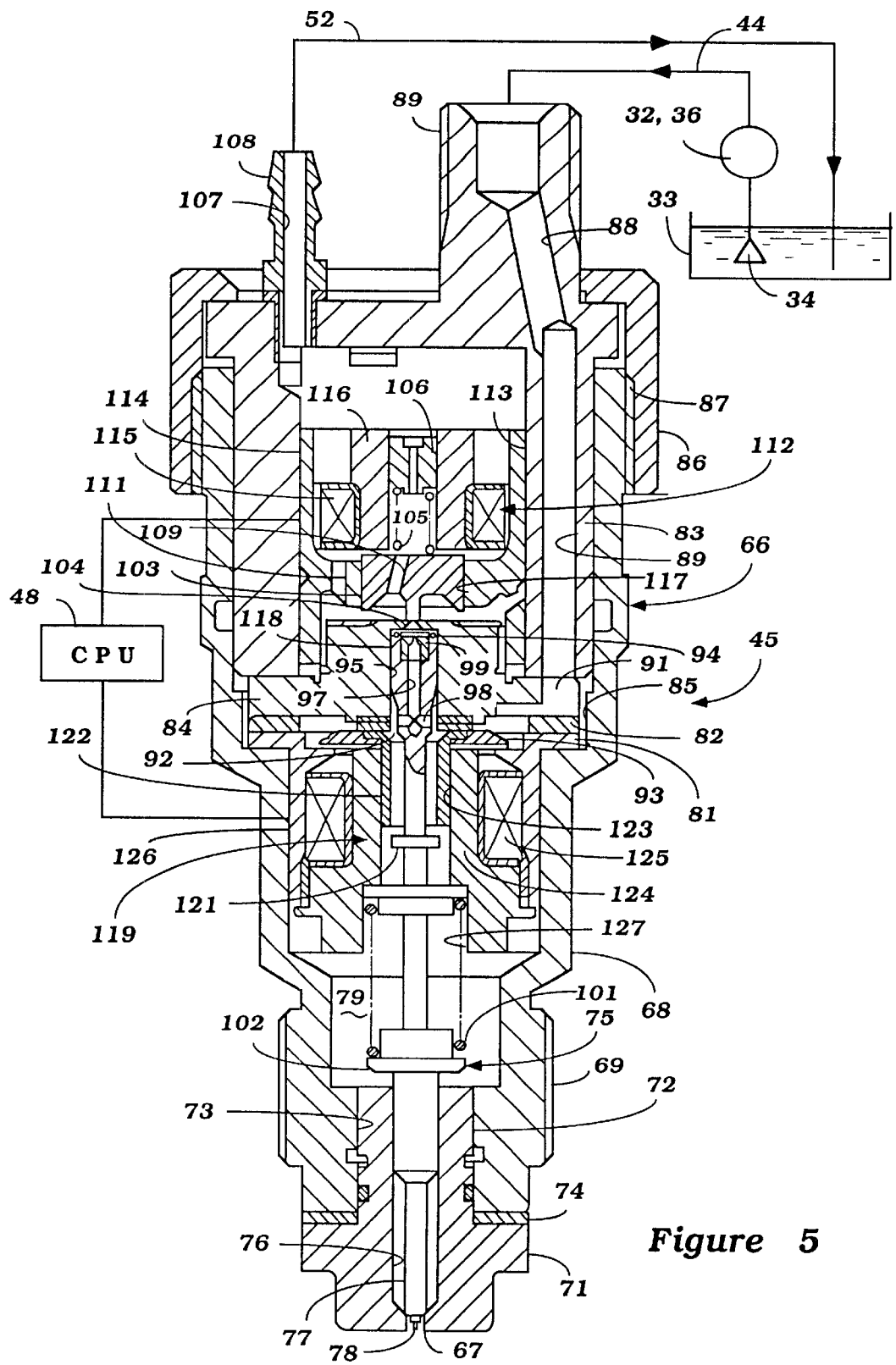
FIG. 5 is an enlarged cross sectional view taken through the fuel injector and shows its relationship to the pumping system in phantom.

Referring now initially to FIG. 5, the injection nozzle 45 if comprised of an outer housing assembly, indicated generally by the reference numeral 66 that is adapted to be mounted, in a manner to be described, in the cylinder head of an internal combustion engine with a nozzle port 67 communicating with the combustion chamber for delivering fuel to it in a manner to be described. Rather than direct cylinder injection, the invention may be utilized in conjunction with manifold injection systems but the invention has particular utility with direct injection, for example as used with high speed diesel engines.

The outer housing 66 is comprised of a lower piece 68 that has a threaded lower end 69 that is adapted to be threaded into a suitable aperture in the cylinder head of the associated engine 31 in a known manner. The nozzle port 67 is defined by a tip 71 that has a threaded portion 72 that is received in a threaded bore 73 formed at the lower end of the housing piece 68. An adjusting shim 74 is interposed between the tip 71 and housing piece 68 for length adjustment.

An injection valve 75 is slidably supported within a bore 76 of the nozzle piece 71 and has a reduced diameter portion 77 and a flow controlling tip 78 configured as will be described and which, in the closed position, closes the injection nozzle port 67. The valve portion 77 has interrupted enlargements for slidably supporting the injection valve 75 in the bore 76 in a known manner.

An accumulator chamber 79 is formed above the bore 76 by the housing piece 68. The accumulator chamber 79 is closed at its upper end by means of a closure plate 81 that is held by a spacer 82 received in a recess in the housing piece 68 by a second housing piece 83. The housing piece 83 engages a partition member 84 that is received within a bore 85 of the housing piece 68 so as to hold the closure plate 81 in position and maintain the chamber 79 in a sealed condition, except as is hereinafter noted. The housing piece 83 is retained relative to the housing piece 68 by means of a threaded cap 86 that is received on a threaded portion 87 at the upper end of the housing piece 68.

The housing piece 83 is formed with an inlet conduit 88 that has a threaded external portion 89 so as to receive a fitting for connecting the supply line 44 extending from the high pressure pump 36 to the inlet conduit 88.

The inlet conduit 88, which is generally a drilled opening, is intersected by a further drilled passageway 89 that extends axially along the housing piece 83 at one side thereof and which communicates at its lower end with a corresponding passage 91 in the partition member 84. The passageway 91 delivers fuel under pressure to the accumulator chamber 79 through a port 92 formed in a control stop armature 33. The function of the control stop armature 93 will be described later.

A control chamber 94 is formed in the partition member 84 by means of a bore 95 that opens through the lower end of the partition member 84. The injection valve 75 has a generally cylindrical actuator portion 96 that is slidably supported within the bore 95 and which closes the lower end of the control chamber 94. A passageway 97 formed in the actuation portion 96 intersects a bore 98 formed therein which pressurizes the control chamber 94, through a metering jet 99 and normally urges the injection valve 75 toward its downward or closed position.

A coil compression spring 101 encircles the injection valve 75 and bears against the housing assembly 66 in a manner to be described. The lower end of the spring 101 engages a shoulder formed by an enlargement 102 on the injection valve 75 so as to further assist in maintaining the injection valve 75 in the closed position as shown in FIG. 5.

A relief valve 103 is supported in a means to be described within the housing assembly 65 above the upper end of the partition member 84 and controls the opening of a relief passage 104 formed in the upper end of the partition member 84. The relief valve 103 is normally biased to a closed position by means of a coil spring 105 the tension of which is adjusted by a screw 106.

The relief valve 103, when opened, will permit the fuel in the control chamber 94 to return to the tank 33 through a return passage 107 formed in a fitting 108 that extends axially through the end of the housing piece 83 parallel to the inlet passageway 88. The return passageway 107 communicates with the conduit 52.

Fuel can flow from the relief valve passageway 104 to the return passageway 107 through a passage 109 formed in the relief valve 103 and a port 111 formed in a yoke 114 of an electromagnetic assembly, indicated generally by the reference numeral 112. This yoke of the electromagnetic assembly 112 is suitably fixed in a bore 113 of the housing piece 83 so as to secure the electromagnetic assembly 112 in position.

The electromagnetic assembly 112 is comprised of a solenoid coil or winding 115 that is disposed in the yoke 114 and which encircles a core 116. The core 116 is formed with a threaded bore that supports the adjusting screw 106 of the relief valve 103. The core 116 coacts with the relief valve 103 for opening it when the winding 115 is energized. It should be noted that the relief valve 103 is slidably supported in a bore 117 of the yoke 114.

As should be readily apparent, energization of the solenoid winding 115 will attract the relief valve 103 so as to open the relief valve port 104 and deplete the pressure in the control chamber 94. This depletion in pressure will cause the pressure acting on the injection valve 75 to urge the injection valve 75 upwardly toward an open position compressing the spring 101 and causing an amount of fuel to be delivered. The full opening position of the injection valve 75 is controlled by means of a control shim 118 that is in position in the control chamber 94 and which will be engaged by the actuating portion 96 so as to limit the degree of maximum opening. As has been noted, with a system as thus far described, the only way the amount of fuel injected can be varied is by varying the pressure in the accumulator chamber 79 and/or the rate and time of opening of injection valve 75.

A control stop mechanism, indicated generally by the reference numeral 119 is provided in the accumulator chamber 79 below the partition member 84 and cooperates with a stop shoulder 121 on the injection valve 75 to control its degree of movement. This control stop mechanism 119 includes the armature 93 previously described and which has a cylindrical extension 122 that is receive within a bore 123 of a core 124 of a solenoid. A solenoid winding 125 encircles the core 124 and is held in place by means of a yoke 126 that is received within the upper end of the accumulator chamber 79. The closure member 81 is formed integrally within the yoke 126. The core 124 is provided with a counter bore 127 that receives the spring 101 as previously described.

When the winding 125 is not energized, the armature 93 and its extension 122 may move to the upper position as shown in FIG. 5 and energization of the solenoid winding 115 will cause full reciprocal movement of the injection valve 75. However, when the winding 125 is energized, the armature 93 and extension 122 will be drawn downwardly so as to engage the shoulder 121 on the injection valve 75 and limit its upward movement. This operation will be discussed further in conjunction with FIGS. 6 and 14.

The CPU 48 may be programmed to provide a suitable control, an example of which will be described by reference to a FIG. 9 through 14, provides the control strategy for actuating the winding 115 of the electromagnet 112 that controls the relief valve 103 and the winding 125 of the stop mechanism 119. In a typical example, the control mechanism 48 may receive input signals from a throttle position loan and an engine speed indicator.

Figures 6, 7, 8:
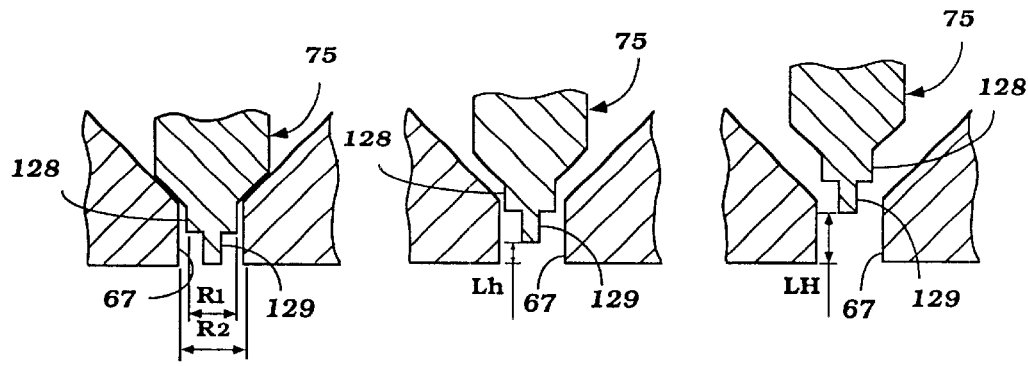
FIGS. 6, 7 and 8 are cross sectional views taken through the discharge nozzle portion of the injector in, respectfully, a closed, partially opened and fully opened condition.

Referring to FIGS. 6 through 8, as has been previously noted, the control tip portion 78 of the injection 75 is provided with a configured end so as to vary the amount of fuel supplied depending upon its position. For example, the end 78 is provided with a first, larger diameter cylindrical portion 128 and a second smaller diameter portion 129 that corporate with the nozzle port 67 so as to control the flow through it. FIG. 6 shows the closed position, while FIG. 7 shows the position for low fuel flow. In this position the solenoid wining 125 will be energized so as to limit the degree of opening of the injection 75 to the height Lh. In this position, the nozzle port 67 is open but the larger diameter portion 128 of the injection valve tip 75 will still be in position in the nozzle port 67 so as to limit the fuel delivery. The large diameter portion 128 has a diameter $R_1$ that is slightly smaller than the diameter $R_2$ of the nozzle port 67 to provide a controlled flow area to limit the amount of fuel delivery, as noted.

On the other hand, when the winding 125 is not energized the injection valve 75 may move fully open to the position shown in FIG. 8 wherein the valve 75 moves through the distance LH. In this position, only the smaller diameter portion 129 will extend into the injection port 67 and substantially unrestricted fuel flow will be provided.

Figures 9, 10, 11:
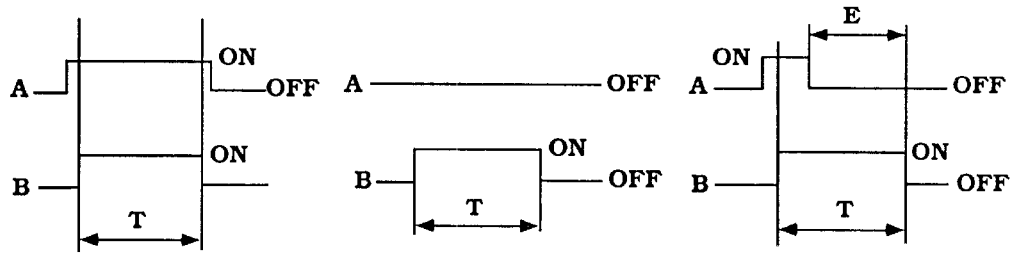
FIGS. 9, 10 and 11 are graphical views showing the drive pulses for the injector valve issued from the micro computer in response to different running conditions.
Figures 12, 13, 14:
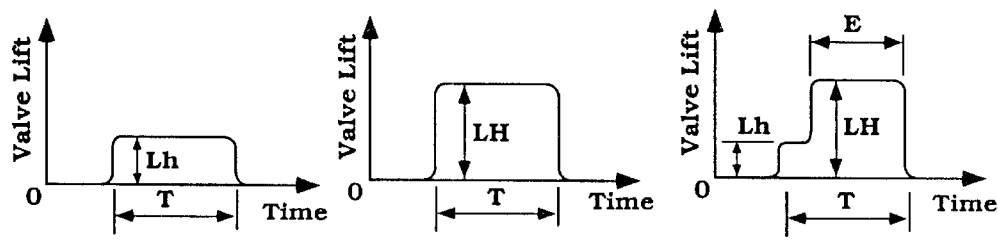
FIGS. 12, 13 and 14 are graphical views showing the valve lift in relation to time for each of the pulse patterns shown in FIGS. 9 through 11, respectfully.

Referring now to FIGS. 9 through 14, one form of control strategy is depicted. For low engine speeds and when low fuel discharge is required, both the solenoid winding 125 is energized (pulse A) and the solenoid winding 115 is energized (pulse B) for the full time period T. When this occurs, the injection valve will move to the position shown in FIG. 10 and provide a fuel discharge as shown in FIG. 12. To achieve maximum fuel flow, only the solenoid winding 115 is energized and the solenoid winding 125 is not energized as shown in FIG. 10. The injection valve 75 is then held in its fully open position LH for the time T so as to achieve maximum fuel discharge as shown in FIG. 13.

FIGS. 11 and 14 show how intermediate speed and low ranges can be accommodated by providing full energization of the winding 115 for the time T and varying the energization of the winding 125 for varying time periods so as to provide an initially low opening of the injection 75 Lh and then a full opening LH for a variable time period E. By varying the relative times, the amount fuel delivered can be accurately controlled.

Referring to FIGS. 6 through 14, the fuel injection duration T is normally set in the range of crank angles of 20 to 24 degrees but may fall within the total range of 15 to 30 degrees. Thus, at the low load conditions as shown in FIGS. 7, 9 and 12, the duration T is generally fixed at approximately 20 degrees when both the electromagnets 125 and 115 are energized. Under the high load condition as shown in FIGS. 9, 10 and 13, when only the electromagnet is energized, the duration T is in the range of 20 to 24 degrees. In the mid range condition as shown in FIGS. 11 and 14, the duration period T is fixed at approximately 20 degrees of crankshaft rotation and the time E is varied in accordance with actual load. All this information is fed into the CPU 48 and the actual figures, as aforenoted, are derived from the mapping of it.

Figure 19:
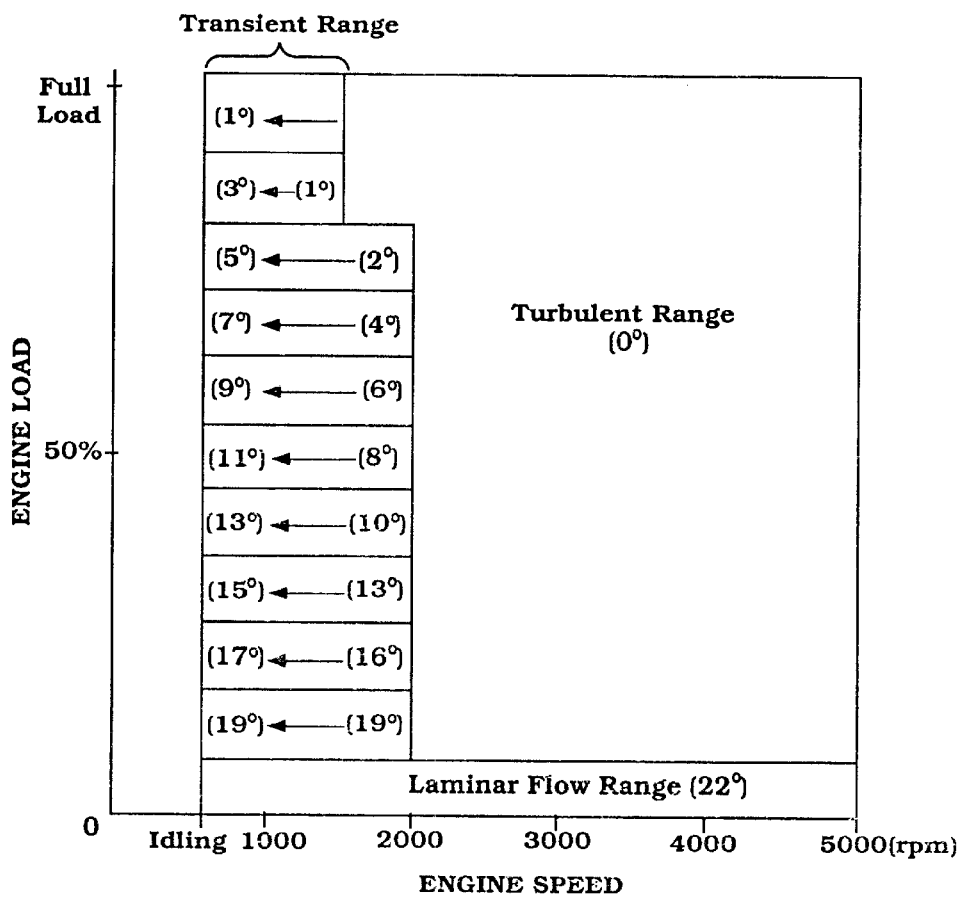
FIG. 19 is graphical view showing optimum energization duration for the electro magnet of the fuel injector according to current engine operating condition in relation to varying engine loads and engine speeds.

FIG. 19 shows a map for deriving the lift amounts Lh and energization durations T and E optimum for operating conditions. The computer or CPU 48, based upon measured data, searches the chart to determine the appropriate fuel control depending upon the characteristics set forth (speed and load).

For example, under the condition where the engine is operating at 3,000 RPM and full load, the CPU 48 determines that the energization duration of the winding 125 is zero degrees and outputs a signal representing this energization duration to the winding 125. In other words, the winding 125 is not energized under this condition. In a like manner, if the engine is operating at 1500 RPM and medium load, the CPU 48 energizes the winding 125 for approximately 8 to 11 degrees of crank angle.

Over the operating condition of low load including idle and the entire engine range from idle to 5,000 RPM, the duration of energization of the winding 115 is fixed at 22 degrees as shown in FIG. 19. This situation occurs when the solenoid 125 is energized so as to maintain the injection nozzle in the condition shown in FIGS. 7, 9 and 12 so as to insure laminar flow through the nozzle and less variance in flow rates.

Figure 20:
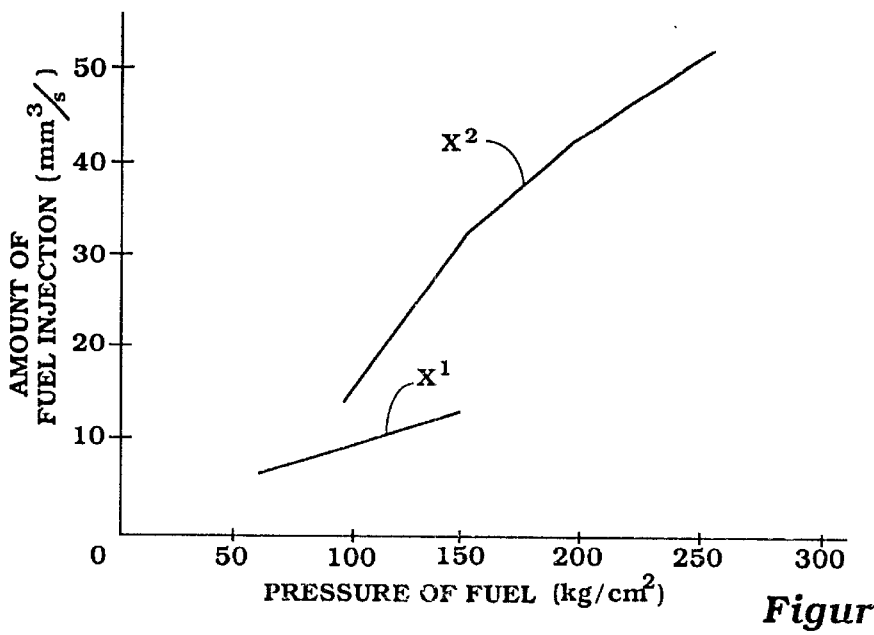
FIG. 20 is a graphical view showing the relationship between fuel pressure and fuel injection rate.

Even if there is a change in ambient temperature so as to cause the viscosity of the fuel to change and the pressure of the fuel supplied to the fuel injector changes, the rate of change in fuel injection rate with respect to fuel pressure is kept low as shown by the curve X-1 in FIG. 20 so that the engine speed remains well stabilized in the low revolution range including idling.

As the engine operates in shifts from low load to high load, high revolution where the fuel injection rate increases, the energization duration of the winding 125 will become zero and the injection valve 75 moves to the position shown in FIG. 8 and the control is in the maximum lift duration. As a result, the amount of fuel flowing out of the nozzle opening 68 becomes turbulent and injection rate may be secured to meet the required fuel injection rate in the high low high revolution operating range as shown by the curve X-2 in FIG. 20. To provide speed control, the CPU 48 can act to prevent energization of either of the windings 115 and 125 at the desired maximum speed, such as 5,000 RPM. This will stop fuel injection by returning the injection nozzle to the position shown in FIG. 6.

Previously the relief valve 103 has been formed with a large annular disc shaped armature. However, this causes certain problems in that when the relief opening 104 is opened, any air which may be mixed with the fuel will be ejected into the chamber below the relief valve 103. If air finds its way into this area, then an air layer might be formed in the space between the valve and its core and the valve might not operate smoothly. However, in this embodiment since the relief valve 103 has a small diameter plunger type with less area facing the core 116, the probability of air bubbles entering this space is substantially reduced and the operation will be improved.

Except for the construction of the relief valve 103, the construction and operation of the injector 45 is substantially the same as that disclosed in U.S. Letters Pat. No. 5,004,154 entitled High Pressure Fuel Injection Device For Engine, issued Apr. 2, 1991 and assigned to the assignee hereof. That patent and its disclosure is incorporated herein by reference for a more detailed description of the construction and operation of the injector 45.

In addition to the improved fuel control permitted by the use of the two solenoids 125 and 115, an arrangement is also incorporated for controlling the pressure of the fuel supply to the injector 45 to still further improve the operation of the total fuel injection system. As has been previously noted, the pressure relief valve 46 is provided for this purpose and the construction and operation of this valve will now be described by particular reference to FIGS. 2 through 4.

The pressure release valve 196 includes a bore 131 formed in the plunger housing 59 into which a valve seat element 132 is positioned. A nut 133 has a threaded connection 134 with the plunger housing 159 to maintain an O ring seal 135 at the end of the seat member 132 into sealing engagement with the plunger housing 59.

A passageway 136 is formed in the plunger housing 59 for communicating the pressure chamber 42 on the upstream side of the filter 43 with a valve opening 137 formed in the valve seat member 132. A ball type valve element 138 is slidably supported within a bore 139 formed of the valve seat member 132 and normally closes the valve opening 137. A piston member, indicated generally by the reference numeral 141 has a cylindrical portion 142 that is slidably supported within the bore 139 and which has a tip portion that engages the ball 138 and will hold it in a seated position, under conditions to be described.

The piston number 141 has a larger diameter portion 143 that is received in a larger diameter bore 144 formed in a closure member 145 that is fixed suitably to the plunger housing 59. The smaller diameter portion 142 of the piston member 141 has a through bore 146 that communicates with a chamber 147 formed at the upper end of the bore 145. Ports 148 extend through the tip of the smaller diameter piston portion 142 to communicate the bore 139 with the bore 146 and chamber 147 when the ball valve 138 is open.

High pressure fuel has been admitted to the relief valve 146 by opening of the ball valve 138 will exert a pressure in the chamber 147 on the larger diameter portion 143 of the piston 146 so as to force it downwardly to move the ball valve 138 to its closed position. Hence, pressure is then maintained in the system. In order to reduce the pressure, a solenoid operated valve 47, now to be described, is provided for selectively dumping the pressure in the chamber 147 to atmosphere so as to reduce the pressure of fuel in the high pressure chamber 42 and, accordingly, the pressure of the fuel delivered to the injector 45.

A further chamber is formed by a bore 149 in the closure piece 145. This bore is closed by a valve seat member 151 that carries an O ring seal 152 that surrounds a communication passageway 153 extending from the piston chamber 147 to the bore 149. The valve seat member 151 has a relief passageway 154 that communicates with the passageway 153.

The valve seat member 151 is held in position by a yoke 155 of the solenoid 47 which is, in turn, held in place by a cover piece 156 that is secured to the closure member 145 by a nut 157. The solenoid 47 has a winding 158 that surrounds a core 159 which, in turn, has a bore 161 that receives a plunger 162 of an armature 163. The armature 163 engages a ball type valve 164 to hold the valve port 154 in its closed position. A leaf type spring 165 engages the armature plunger 162 for holding the valve 164 in its closed position.

When the solenoid winding 158 is energized, the armature 163 will be drawn upwardly and fuel pressure in the passage 153 and bypass passage 154 will unseat the ball check valve 164 and permit fuel flow through ports formed in the yoke 155 to a chamber 166 formed by the cover piece 156. A fuel return fitting 167 communicates with the return conduit 52 for returning the fuel back to the fuel tank 33 so as to reduce the pressure in the chamber 42 and, accordingly, the fuel supplied to the injector 45.

The pressure generated by the plunger 37 is employed to determine when the solenoid 47 should be operated to open the relief valve 46. For that purpose, there is provided a pressure sensor 168 (FIG. 4) that communicates with the plunger bore 61 through a small orifice 169. As seen in this figure, a ball type check valve 171 is provided in the conduit 35 that connects the low pressure chamber 58 with the plunger bore 61. This check valve 171 insures that pressure from the action of the plunger 37 will not be dissipated back into the low pressure chamber 58.

The output pressure from the pressure sensor 168 is transmitted to the CPU 48 so as to determine when the conditions are such that the pressure should be relieved. This is determined in a manner which will be described and when the pressure is to be relieved, the solenoid winding 158 is energized to permit the ball valve 164 to open and reduce the pressure in a chamber 147 to cause the piston 141 to move upwardly unseating the ball valve 138 and relieving the pressure generated by the plunger 37 in the bore 61. This will reduce the pressure transmitted to the high pressure chamber 42. Reduced pressure in the chamber 42 will reduce the pressure of fuel supplied to the injector 45, and, accordingly, the amount of fuel injected by the injector 45 during its operation.

The pressure relief valve 46 has a differential area between the high pressure area defined by the valve opening 137 and the bore 139 and between the bore 139 and the larger bore 144 that permits the control of high pressure with low pressure components. That is the pressure sensor 168 and solenoid 47 and valve 164 can operate at lower pressures than the actual pressure controlled.

Figure 15:
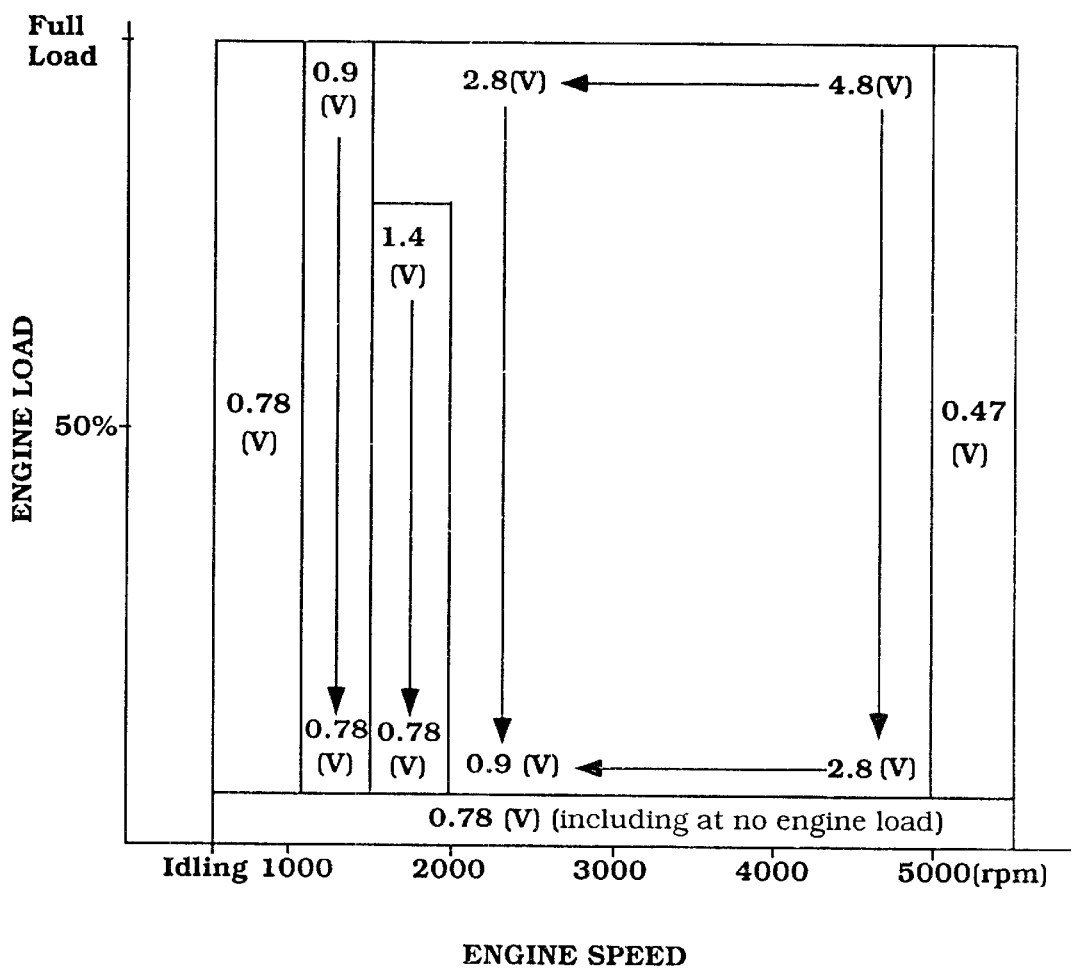
FIG. 15 is a graphical view showing the optimum voltage signal representative of the optimum fuel pressure supplied to the fuel injector according to the current engine operating condition based upon varying engine speeds and loads.
Figure 16:
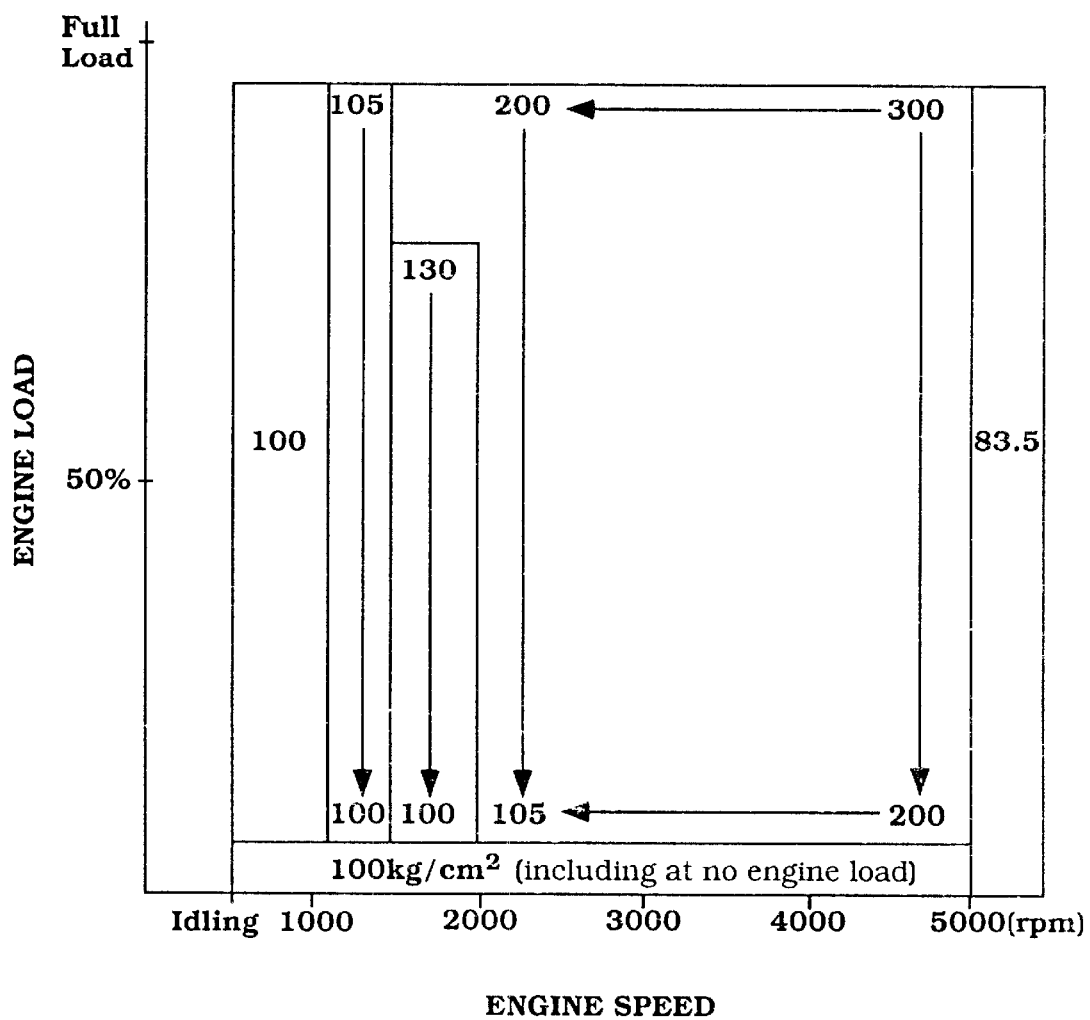
FIG. 16 is a graphical view showing optimum fuel pressure according to current engine operating condition based upon varying speeds and engine loads.

As has been noted, the CPU 48 determines the conditions under which the relief valve 46 should be operated so as to reduce the fuel pressure supplied to the fuel injector 45. A map is generated in the CPU 48 for this purpose and this map is based upon voltage signals comprised of the voltage output from the pressure sensor 168 and the voltage to be applied to the winding 158 so as to reduce the pressure. FIG. 15 is a graphical view showing the voltage signal necessary to provide the desired fuel flow and FIG. 16 shows the amount of fuel flow required, both curves being related to engine speed and engine load. It will be seen from these figures that the reference voltage varies within the range of 0.47 volts to 4.8 volts and then the fuel pressure supplied to the fuel injector 45 will vary in the range of 83.5 kilograms per square centimeter to 300 kilograms per square centimeter.

Figure 17:
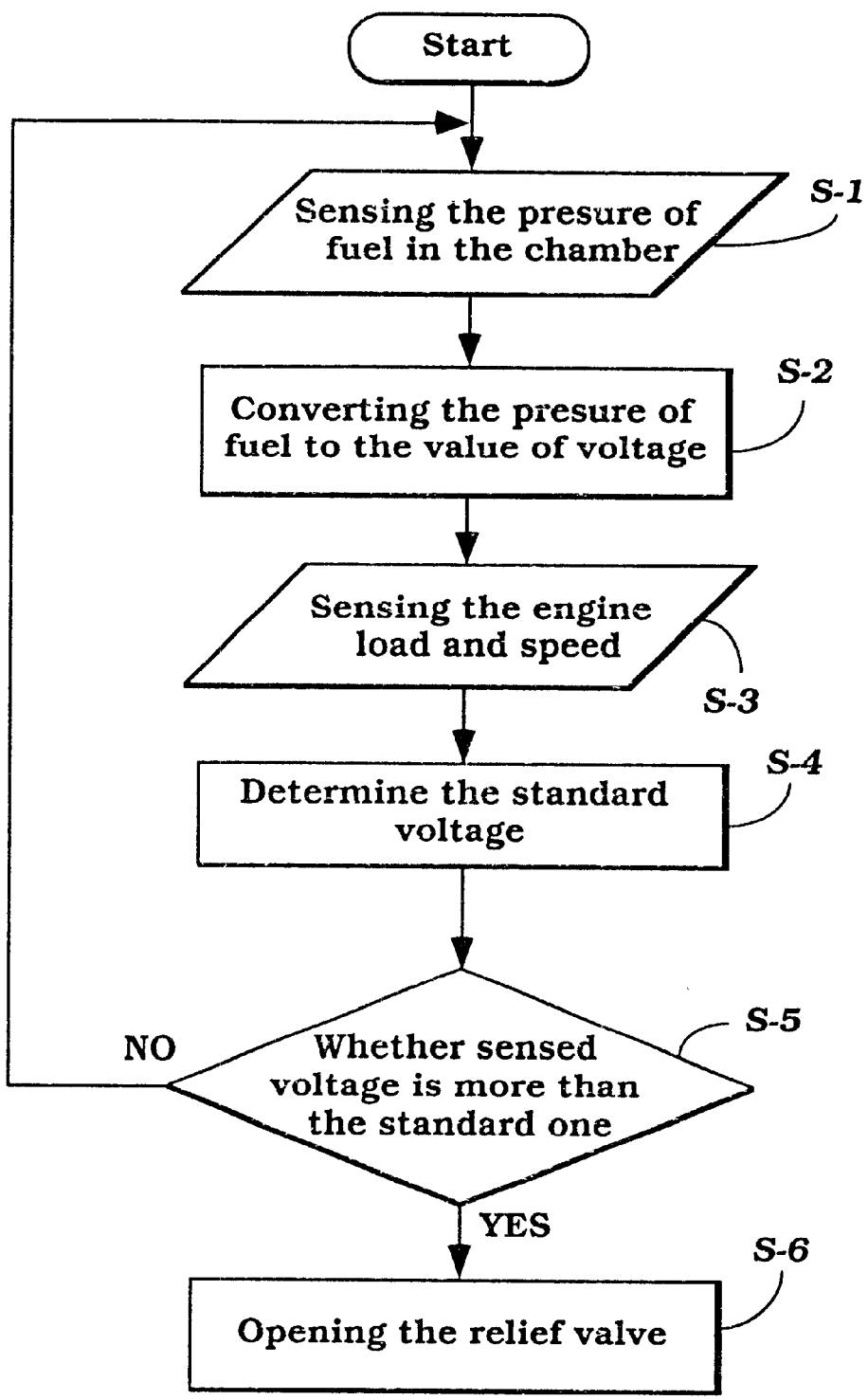
FIG. 17 is a block diagram showing the routine of computer processing for controlling the fuel pressure.

Basically, the way CPU 48 achieves the desired pressure is to have a map of reference voltages indicating the appropriate pressure for a given engine running condition, such as load and speed. This reference voltage $V_2$ is then compared with the voltage $V_1$ representing actual fuel pressure and if the actual fuel pressure is higher than the reference voltage, the winding 158 is energized so as to reduce the pressure. The control routine is as shown in FIG. 17 wherein the program starts and then moves to the step S1 so as to sense the actual fuel pressure in the plunger bore 61 by the output signal from the pressure sensor 168. This signal is then converted at the step S2 to a voltage value. The program then moves to the step S3 so as to determine the actual engine speed and engine load and then output the standard $V_2$ at the step S4.

The program then moves to the step S5 to determine whether the $V_1$ is greater than the standard or required voltage $V_2$. If it is, the program moves to the step S6 so as to energize the winding 158 and open the relief valve 46 to drop the pressure. If at the step S5, however, it is determined that the pressure is not greater than the standard reference pressure, the program repeats.

Figure 18:
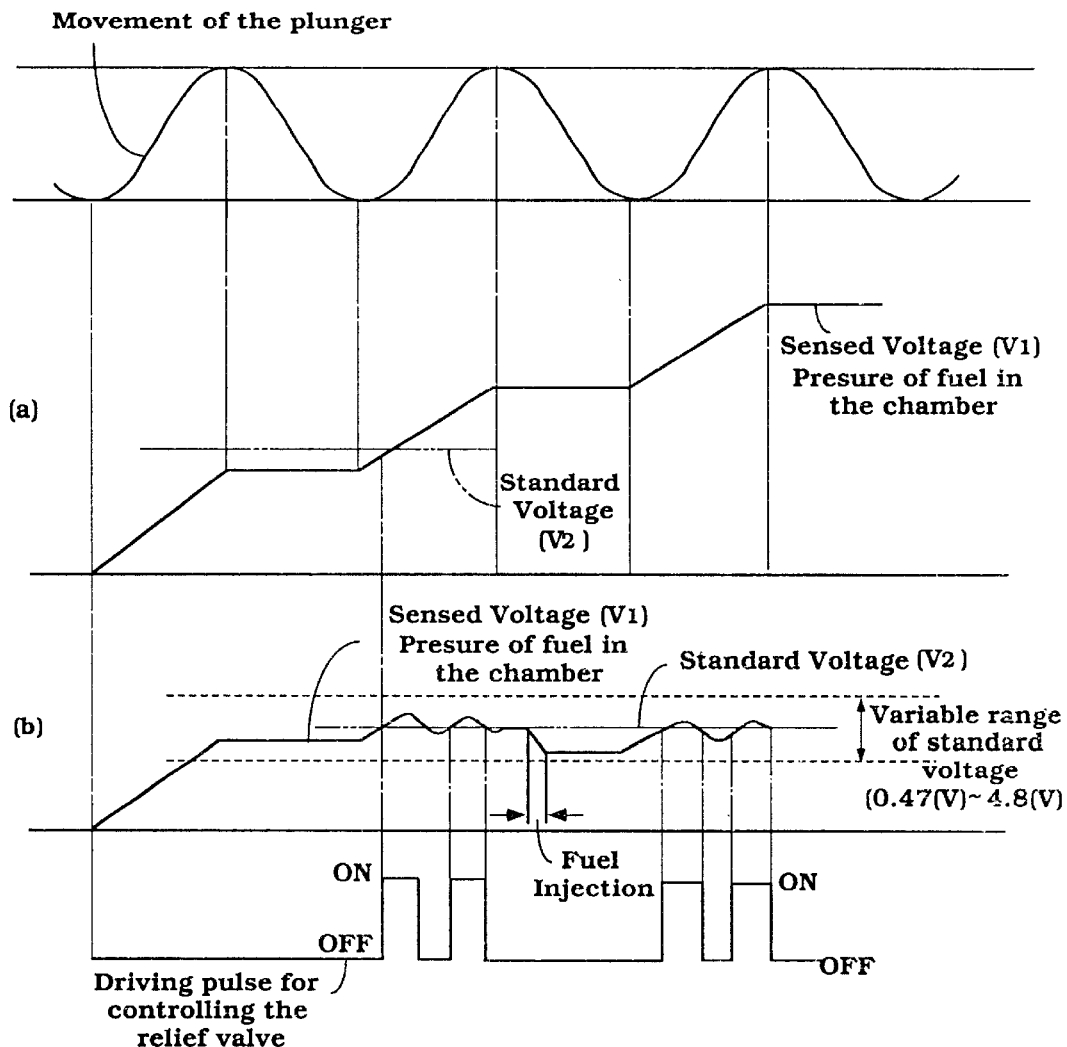
FIG. 18 is a diagram showing the relationship between reference and detected voltages with respect to the drive pulse issued from the micro computer.

FIG. 18 is a graphical view showing the movement of the plunger 37, the relationship of the movement of the plunger 37 and the sensed voltage V1 and its relationship to the desired voltage $V_2$. The curve B shows the relationship during the control operation. As may be seen, when the sensed voltage exceeds the reference voltage, a pulse is generated for driving the relief valve and the pressure will then fall. When the pressure falls below the standard voltage $V_2$, then the relief valve 46 is denergized until the pressure again raises above the reference voltage $V_2$ so as to require the energization of the winding 158 and opening of the relief valve 46 again. It will be seen also that when the injector 45 injects, the fuel pressure will drop and during this time the relief valve 46 will again be shut off.

Therefore, it should be readily apparent that the described arrangement is very effective in controlling the amount of fuel discharge not only by the use of the controlled fuel injector 45 but by regulating the pressure of the fuel supplied to the fuel injector 45. As a result, extremely good running conditions can be achieved.

With the construction as thus far described, extremely good fuel injection control is provided. Engine running can be stabilized under all conditions due to the use of the pressure regulator including the relief valve 46 and its control, as has been previously described. Under some conditions, however, the necessity to generate full pressure before the relief valve is opened can produce high driving loads and reduce the power output of the engine. Therefore, there are certain conditions where it may be desireable to further limit the maximum pressure developed by the pump. However, there becomes a danger when such a pressure limiting arrangement is employed. If the pressure limiting arrangement becomes inoperative and acts to prevent the generation of pressure, then the fuel injector will not be supplied with adequate fuel to provide running under any condition.

Figure 21:
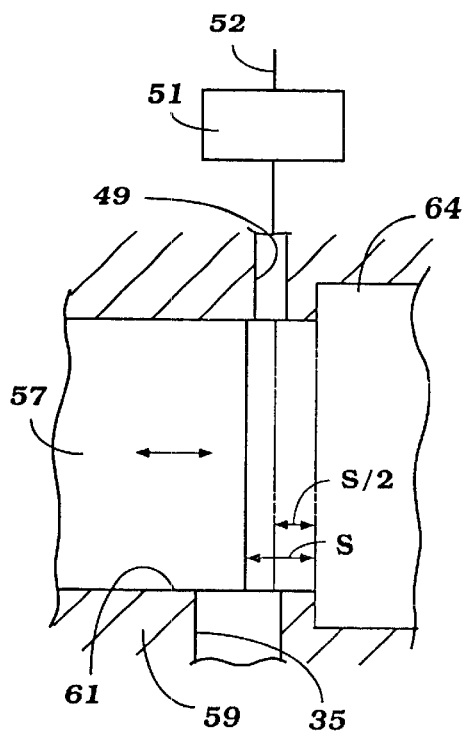
FIG. 21 is an enlarged cross sectional view of a portion of the injection pump showing another portion of the arrangement for controlling the amount of fuel injected and the pressure thereof.

Therefore, there is provided a further release system, shown in most detail in FIG. 21 that is effective to reduce the pressure and yet even in the event of some failure still adequate fuel pressure would be supplied. Referring now to FIG. 21 will be seen that the plunger body 59 is provided with the aforenoted release passage 49 that intersects the bore 61 at a point $S/_2$ below the top dead center stroke S of the plunger 57. The release passage 49 also appears partially in phantoms lines in FIG. 2 and in FIG. 1 to show the orientation relative to the entire mechanism. The release passage 49 is generally positioned at a location which is approximately of one half of the stroke S of the plunger 57.

The release passage 49 communicates with the fuel pressure return line 52 and this communication is controlled by the aforementiond release valve 51 which may be of any known type and generally comprises an on/off valve. The release valve 51 is normally operated by the CPU 48 so as to be closed during starting of the engine and at the time the engine reaches maximum speed and maximum torque. In conditions other than this, the CPU 48 determines the number of pulses that are generated to the solenoid 47 to open and close the relief valve 46 and if this number of openings indicates that more pressure relief is required, the release valve 51 is open so as to further reduce the pressure. A map can be generated to provide this operation.

Figure 22:
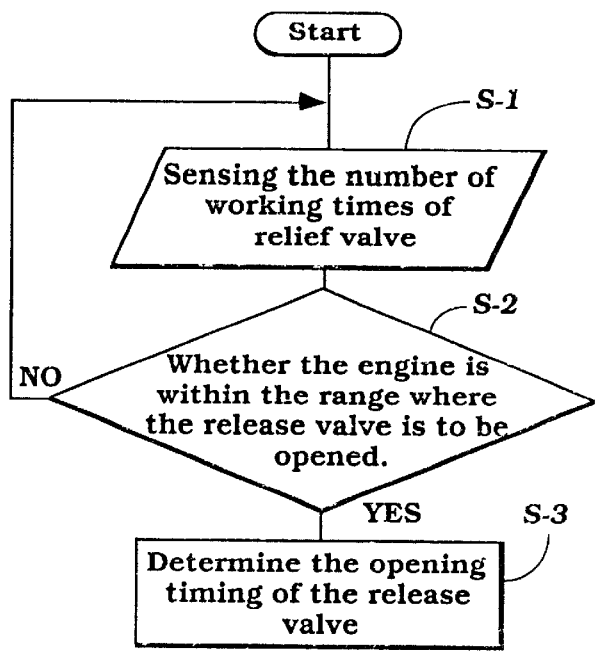
FIG. 22 is a process flow chart showing the operation of the valve in FIG. 21.

The CPU 48 then works in the routine shown in FIG. 22 to move to the step S1 to sense the number of times the solenoid 47 has been energized within a given time period. A comparison is then made at the step S2 to determine whether the operation is such that opening of the release valve is required and if it is in this time period the program moves to the step S3 to determine the time of opening of the release valve 51 to obtain the desired pressure reduction.

Figure 23:
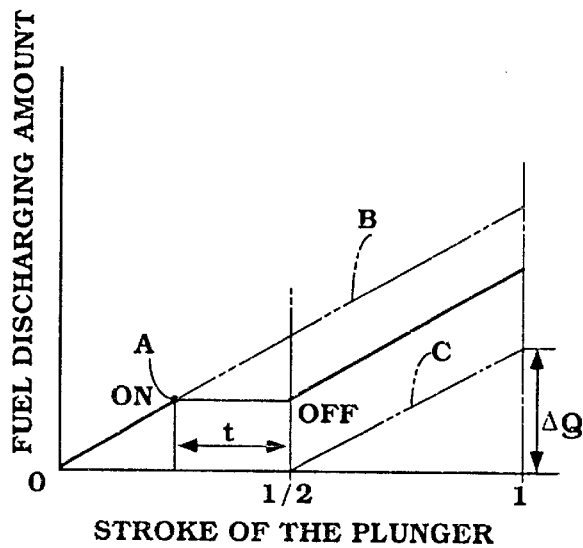
FIG. 23 is a graphical view showing the amount of fuel discharged in relation to the stroke of the plunger when the control valve shown in FIG. 21 is operated.

The effect of the opening of the valve 51 is shown in FIG. 23 wherein the fuel discharge amount in relation to the stoke of the plunger is depicted. At a time T when it is determined to open the release valve 51, the pressure build up will be stopped and once the plunger moves past the release opening 149 the pressure will then build up again so that the pressure will follow the solid line curve than the curve B which would exist when the release valve 51 will not open. The curve C shows that even if the release valve 51 malfunctions and stays open at all times, the plunger 37 will still generate some pressure due to the positioning of the port 175 and a quantity of fuel Q will still be delivered to the injector 45 so as to insure that the engine will run adequately.

Therefore, the release valve 51 is useful in avoiding the generation of unnecessarily high pressures in the pumping system and will reduce the power required to drive the fuel pump and specifically the high pressure pump 36.

Figure 24:
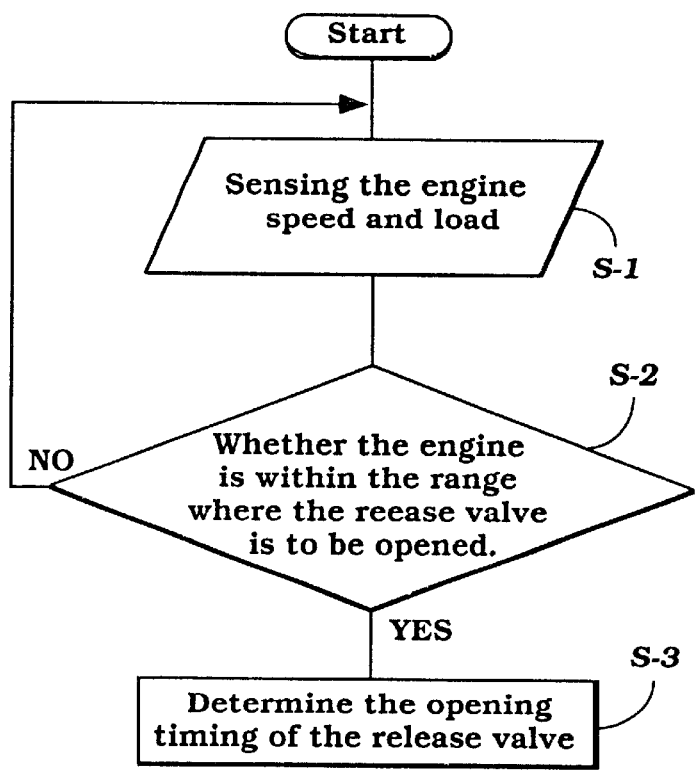
FIG. 24 shows a micro processor flow chart, in part similar to FIG. 22, showing another embodiment of the invention.
Figure 25:
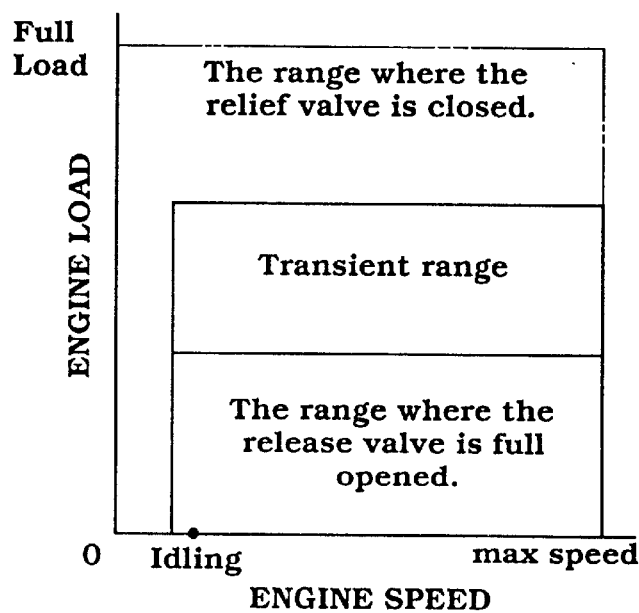
FIG. 25 is a graphical view showing the control ranges within this embodiment in relation to varying engine speed and engine load.

FIGS. 24 and 25 show a different type of control routine for the release valve which does not require the sensing of the number of pulsations of the actuation of the relief valve 46. In this embodiment, the CPU 48 is programmed so as to sense the running condition of the engine when opening the release valve 51 would be desirable. In accordance with this program, once the system starts it moves to the step S1 where the CPU 48 calculates engine and speed and load. The program then moves to the step S2 to determine if the release valve 51 should be opened and if so, moves to the step S3 so as to actually open the release valve 51 and set the timing of its opening.

The relationship of the opening of the release valve relative to engine speed and load is depicted in FIG. 25.

Figure 26:
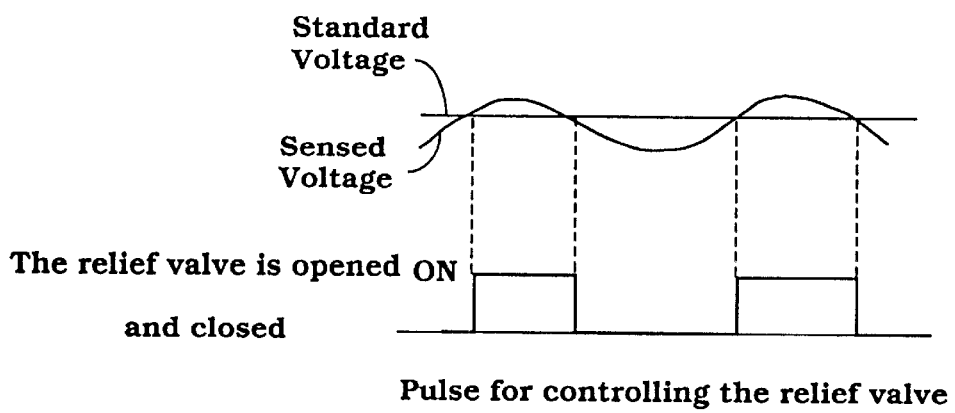
FIG. 26 is a graphical view, in part, similar to a portion of the graph of FIG. 18 in accordance with yet another embodiment of the invention.
Figure 27:
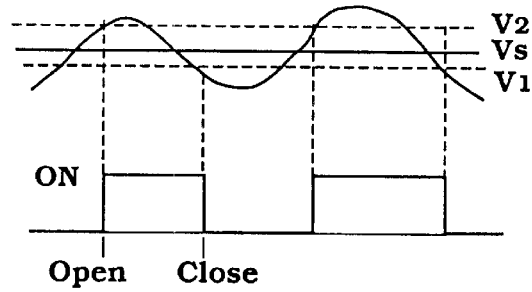
FIG. 27 is a graphical view showing the effect of the hysterisis in this embodiment.

FIGS. 26 and 27 show another arrangement for operating the pressure relief valve 46. In this embodiment, the voltage pulses for generating the operation of the relief valve 46 by energizing the solenoid 47 are substantially the same as depicted in FIG. 18. However, as shown in FIG. 27 the actual effect of hysterisis is shown that indicates the delay in actual opening and closing of the valve due to the hysterisis in the system. The solenoid 47 is energized at a point when the sensed voltage $V_3$ is greater than the predetermined value $V_2$ and deenergized when the sensed voltage $V_3$ is less than the predetermined valve $V_1$. A merit of this embodiment is to be able to descrease the operation of the solenoid 47. Therefore, it has a good effect on decreasing of wearing of moving parts.

Figure 28:
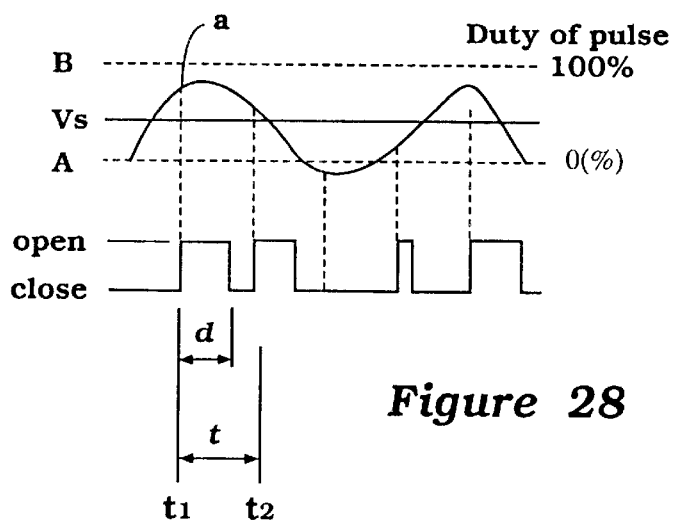
FIG. 28 is a view, in this embodiment, showing the relationship between pulse duration and time of sensing pressure for determining the duty cycle.

Another method of control is shown in FIG. 28. In this method, voltage is not sensed continuously as in the previous embodiments. Also pressure is controlled by varying the duty cycle of the solenoid 47. The pressure (voltage) is sensed at two times T, and $t_2$ spaced from each other by the time period T.

It should be readily apparent from the foregoing description that the described embodiments of the invention provide an extremely effective fuel injection system wherein the amount of fuel supply can be very accurately controlled. In addition, this control is achieved in such a way as to insure maximum power output. Of course, the foregoing description is that of preferred embodiments of the invention and various changes and modifications may be made without departing from the spirit and scope of the invention, as defined by the appended claims.

What is claimed is:

1. A fuel pressure control system for an internal combustion engine comprising a fuel injector, a high pressure fuel injection pump contained within a housing assembly, a pressure chamber formed within said housing assembly and communicating with the discharge of said high pressure pump through a pump outlet in which a delivery valve is positioned, conduit means interconnecting said pressure chamber with said fuel injector for delivering fuel thereto, means for sensing the pressure in said pressure chamber downstream of said delivery valve and means in said housing assembly for reducing the pressure in said pressure chamber in response to engine running conditions for providing the desired amount of fuel discharge by said fuel injector.

2. A fuel pressure control system as set forth in claim 1 further including a low pressure pump in the housing assembly for delivering fluid to the high pressure pump.

3. A fuel pressure control system as set forth in claim 2 wherein the high pressure pump comprises a piston pump.

4. A fuel pressure control system as set forth in claim 3 wherein the means for reducing the pressure in the conduit comprises a pressure reducing valve.

5. A fuel pressure control system as set forth in claim 4 wherein the pressure reducing valve is solenoid operated.

6. A fuel pressure control system as set forth in claim 5 wherein the solenoid operated valve is controlled in response to engine speed and engine load.

7. A fuel pressure control system as set forth in claim 6 further including means for sensing the pressure created by the high pressure injection pump and comparing it with the optimum pressure for the engine running condition.

8. A fuel pressure control system as set forth in claim 7 wherein the sense pressure is converted to a voltage signal and is compared with an optimum voltage signal for the engine running condition.

9. A fuel pressure control system as set forth in claim 3 wherein the piston pump comprises a bore formed in the housing assembly and a plunger reciprocating in the bore for pressurizing fluid therein.

10. A fuel pressure control system as set forth in claim 9 further including a release passage intersecting the bore at a point intermediate the ends of the stroke of the plunger and control valve means for selectively opening and closing the said release passage for controlling the pressure output by said plunger.

11. A fuel pressure control system as set forth in claim 10 further including means for closing the control valve under conditions of starting and high speed operation.

12. A fuel pressure control system as set forth in claim 11 wherein the means for reducing the pressure in the conduit comprises a pressure reducing valve.

13. A fuel pressure control system as set forth in claim 12 wherein the pressure reducing valve is solenoid operated.

14. A fuel pressure control system as set forth in claim 13 wherein the solenoid operated valve is controlled in response to engine speed and engine load.

15. A fuel pressure control system as set forth in claim 14 further including means for sensing the pressure created by the high pressure injection pump and comparing it with the optimum pressure for the engine running condition.

16. A fuel pressure control system as set forth in claim 15 wherein the sense pressure is converted to a voltage signal and is compared with an optimum voltage signal for the engine running condition.

17. A high pressure fuel injection pump comprising a bore, a fluid inlet to said bore for delivering fuel thereto, a plunger reciprocating in said bore for pressurizing fuel therein, a delivery passage having a delivery valve at the end of said bore for discharging fluid pumped by said plunger, a release passage intersecting said bore at a point intermediate the ends of the stroke of said plunger and independent of said fluid inlet, and control valve means for selectively opening and closing said release passage for controlling the pressure output by said plunger.

18. A high pressure fuel injection pump comprising a bore, a plunger reciprocating in said bore for pressurizing fuel therein, a delivery passage having a delivery valve at the end of said bore for discharging fluid pumped by aid plunger, a release passage intersecting said bore at a point intermediate the ends of the stroke of said plunger, and control valve means operated in response to an engine running characteristic for selectively opening and closing said release passage for controlling the pressure output by said plunger.

19. A high pressure fuel injection pump comprising a bore, a plunger reciprocating in said bore for pressurizing fuel therein, a delivery passage having a delivery valve at the end of said bore for discharging fluid pumped by said plunger, a release passage intersecting said bore at a point intermediate the ends of the stroke of said plunger, control valve means for selectively opening and closing said release passage for controlling the pressure output by said plunger and means for maintaining said control valve means in its closed position during engine starting and high speed operation.

20. A high pressure fuel injection pump as set forth in claim 19 wherein the control valve means is operated in response to an engine running characteristic.

21. A high pressure fuel injection system for an internal combustion on engine comprising a fuel injector having chamber to which fuel under pressure is delivered and which communicates with the engine through an injector valve, a reciprocating high pressure fuel injection pump having a plumping chamber communicating with a output port in which a delivery valve is positioned, conduit means interconnecting said high pressure fuel injection pump output port with said fuel injector for delivering fuel thereto, means for sensing the pressure exerted by said high pressure fuel injection pump in said conduit means, and means positioned downstream of said delivery valve for reducing the pressure in said conduit means downstream of said delivery valve in response to engine running conditions for providing the desired amount of fuel discharge by said fuel injector.

22. A fuel pressure control system as set forth in claim 21 wherein the means for reducing the pressure in the conduit comprises a pressure reducing valve.

23. A fuel pressure control system as set forth in claim 22 wherein the pressure reducing valve is solenoid operated.

24. A fuel pressure control system as set forth in claim 23 wherein the solenoid operated valve is controlled in response to engine speed and engine load.

25. A fuel pressure control system as set forth in claim 24 further including means for sensing the pressure created by the high pressure injection pump and comparing it with the optimum pressure for the engine running condition.

26. A fuel pressure control system as set forth in claim 25 wherein the sensed pressure is converted to a voltage signal and is compared with an optimum voltage signal for the engine running condition.

27. A high pressure fuel injection system as set forth in claim 21, further including means for reducing the pressure in the high pressure fuel injection pump upstream of the outlet port only at the beginning of a pumping stroke of said high pressure fuel injection pump.

28. A high pressure fuel injection system as set forth in claim 1, further including means for reducing the pressure in the high pressure fuel injection pump upstream of the outlet port only at the beginning of a pumping stroke of said high pressure fuel injection pump.

\* \* \* \* \*